(12) United States Patent
Daly

(10) Patent No.: US 6,864,445 B1
(45) Date of Patent: Mar. 8, 2005

(54) LATCHING FLUID LEVEL SWITCH

(76) Inventor: Lewis J. Daly, 5890 Pierson Rd., Fayetteville, NY (US) 13066

( * ) Notice: Subject to any disclaimer, the term of this patent is extended or adjusted under 35 U.S.C. 154(b) by 0 days.

(21) Appl. No.: 10/654,465

(22) Filed: Sep. 3, 2003

(51) Int. Cl.[7] ............................................. H01H 35/18
(52) U.S. Cl. .................................................... 200/84 R
(58) Field of Search ............................. 200/84 R–84 C; 73/305, 307, 308, 311, 317, 322.5; 340/618, 623, 625

(56) References Cited

U.S. PATENT DOCUMENTS

| | | | | |
|---|---|---|---|---|
| 3,309,687 A | * | 3/1967 | Phipps ..................... | 200/84 B |
| 3,483,342 A | * | 12/1969 | Mauro ...................... | 200/84 C |
| 3,531,767 A | * | 9/1970 | Klein et al. ............... | 200/84 R |
| 4,001,533 A | * | 1/1977 | Conery et al. ............ | 200/84 C |
| 4,539,270 A | * | 9/1985 | Mejia .......................... | 73/317 |
| 6,326,895 B1 | * | 12/2001 | Hartke et al. ............... | 340/612 |
| 6,748,805 B2 | * | 6/2004 | Lease .......................... | 73/313 |

* cited by examiner

*Primary Examiner*—Michael A. Friedhofer
(74) *Attorney, Agent, or Firm*—Wall Marjama & Bilinski, LLP

(57) ABSTRACT

A latching fluid level switch which includes an elongated shaft member having a lower end and an opposite upper end with both ends containing a buoyant float member. The upper end is pivotally anchored to a tank wall and capable of having its lower end being moved between two distinct angular positions depending on the level of the liquid in said tank acting on said float member and having a first higher buoyancy angular position representing a high liquid level endpoint, and a second less buoyancy angular position representing a lower liquid level endpoint. The float is maintained at each distinct angular position such that once triggered at one liquid level endpoint the float will maintain and hold that angular position until reversibly triggered at the other liquid level endpoint.

11 Claims, 5 Drawing Sheets

LATCHING FLUID LEVEL SWITCH

BACKGROUND OF THE INVENTION

In controlling the liquid level in sumps and tanks there has been a continuing need in the field to be able to turn on or off a pump in response to a liquid level in a tank for the purpose of draining a tank when full, or conversely filling a tank when empty. More specifically there is a need to turn on a pump when a given liquid level is reached, and keep a pump running until a second liquid level is reached.

Current prior art methods of turning on/off or controlling a pump in response to the level of water in a tank include:

1—Single float activating separate high and low level mechanical switches

2—Double floats activating double reed switches

3—Tethered float containing a single tilt sensitive switch whose on/off contact state is a result of the angular orientation the float/switch takes at both water level extremes as a result of being tethered at one end.

4—Tethered float containing double tilt sensitive switches with float operation similar to 3 above.

The first two methods described above use various forms of switches triggered by a float, which is responsive to the water level, to send a signal to start a pump. In order to maintain the pump running, once the trigger signal is lost, when the float no longer activates the switch, requires some form of latching methodology. The first two methods require and employ an additional holding circuit or relay to perform this latching function and keep the pump running after loss of the trigger signal. This system because of its relative complexity, is relatively expensive and has multiple components which must be maintained.

The third method of level sensing, which is responsive to the angular position of a tethered float switch which, as the water level decreases, passes through a positive up-angle position to a negative down-angle position in relation to the tether pivot point due to being restrained by the tether cable or arm. The up- and down-angle positions determine whether an enclosed tilt sensitive switch is making or breaking the flow of electricity within the switch to the pump. This method does maintain a closed contact for some portion of the total tether travel when the float dwells in the tethered up-angle or down-angled position.

The fourth method is similar to tethered float operation as described above, and similar in electrical operation as 1 and 2 above, using double switch triggering and requiring some additional form of latching circuitry.

It can be seen that the current prior art methods described above require relatively complex systems which are costly and require diligent maintenance to keep operational.

BRIEF DESCRIPTION OF THE DRAWINGS

For a further understanding of these and objects of the invention, reference will be made to the following detailed description of the invention which is to be read in connection with the accompanying drawing, wherein.

SUMMARY AND DETAILED DESCRIPTION OF THE INVENTION

It is therefore an object of the present invention to provide a latching fluid level switch which overcomes the problems of the prior art described above.

It is a further object of the present invention to provide a low cost, single contact level float switch which is capable of turning a pump on and off and controlling the liquid level in a tank at predetermined positions without the use of an external electrical latching or holding circuit.

It is another object of the present invention to provide a liquid level float switch which can control the liquid level in a tank at two predetermined levels.

The present invention is directed to a low cost, single contact liquid level float switch capable of turning a pump on and off and latching or holding the contact in the initial triggering position for the duration of the pumping cycle without the use of an external electric latching or holding circuit.

In one embodiment of the present invention as illustrated in FIGS. 1–5, a buoyant component 10 which includes an elongated shaft 12, having a lower float member 14, and an upper float member 16 is pivotally anchored at 18.

Figure 1:
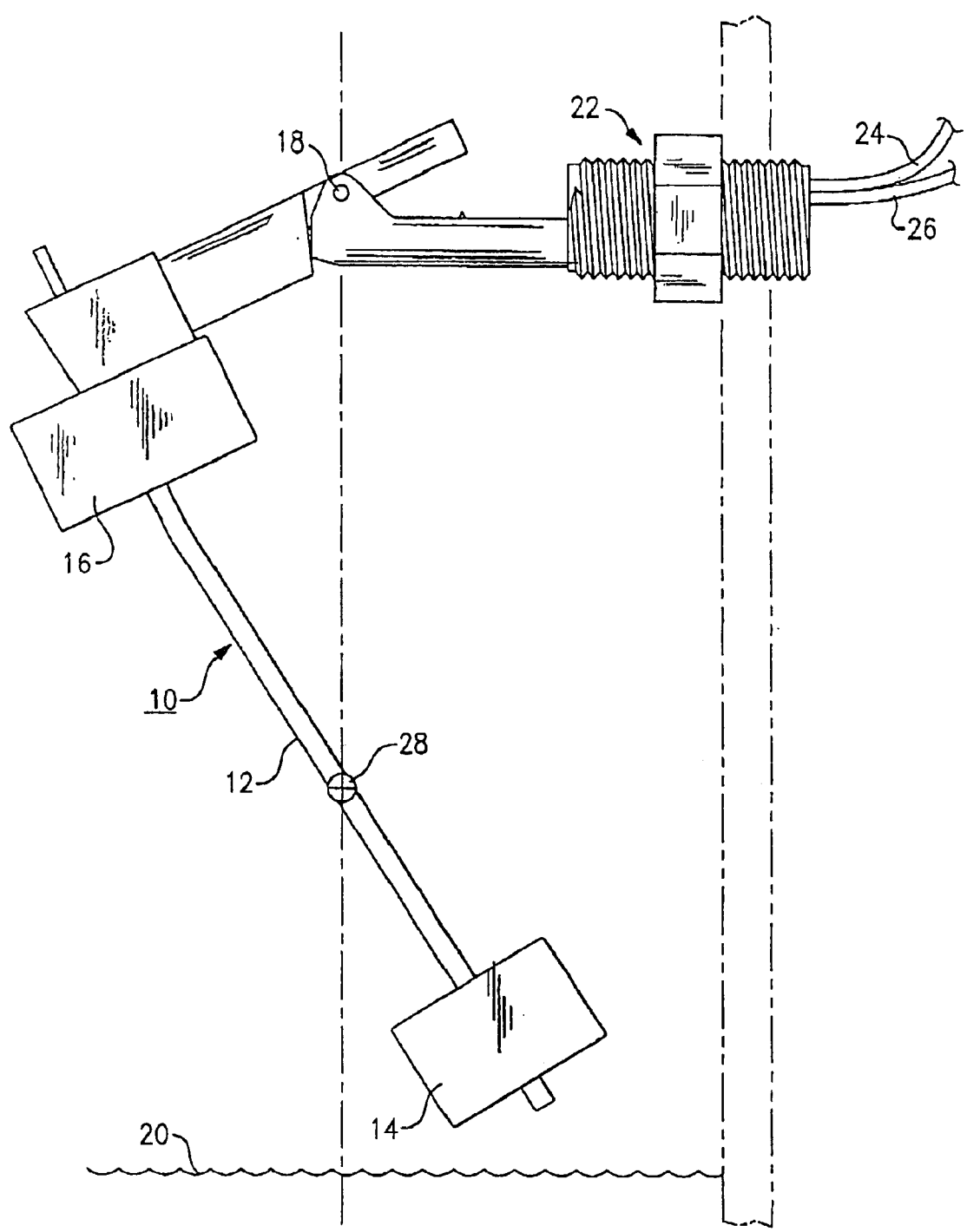
FIG. 1 is a side view of one embodiment of a float controlled fluid level switch in the "off" position with the liquid level below the controlling buoyant component.
Figure 2:
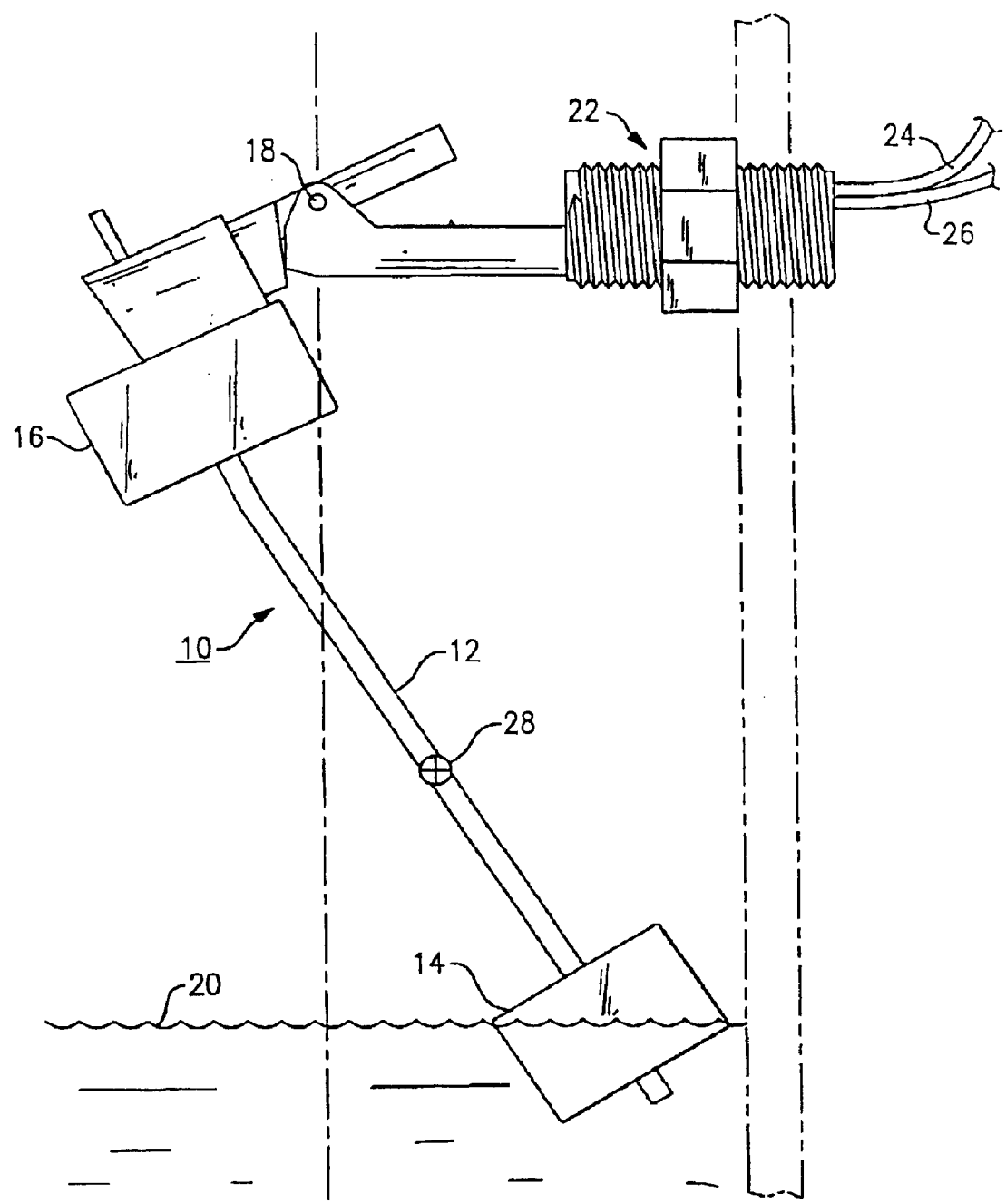
FIG. 2 is a side view of FIG. 1 with the liquid level higher and in contact with a lower float member and the switch still in the off position.

When the water or liquid level 20 is below float member 14 as illustrated in FIG. 1, buoyant component 10 will maintain itself stationary about its center of gravity 28. As the water level rises, the center of gravity for illustrative purposes will move to the right as illustrated in FIG. 2 because of the buoyant force created by float member 14, and will be held in the state shown in FIG. 3 until the buoyant force on upper float 16 overcomes the buoyant force on float 14, and moves the shaft 12 of buoyant component 10 and center of gravity 28 to the left of the vertical axis through pivot point 18 as shown in FIG. 4.

Figure 3:
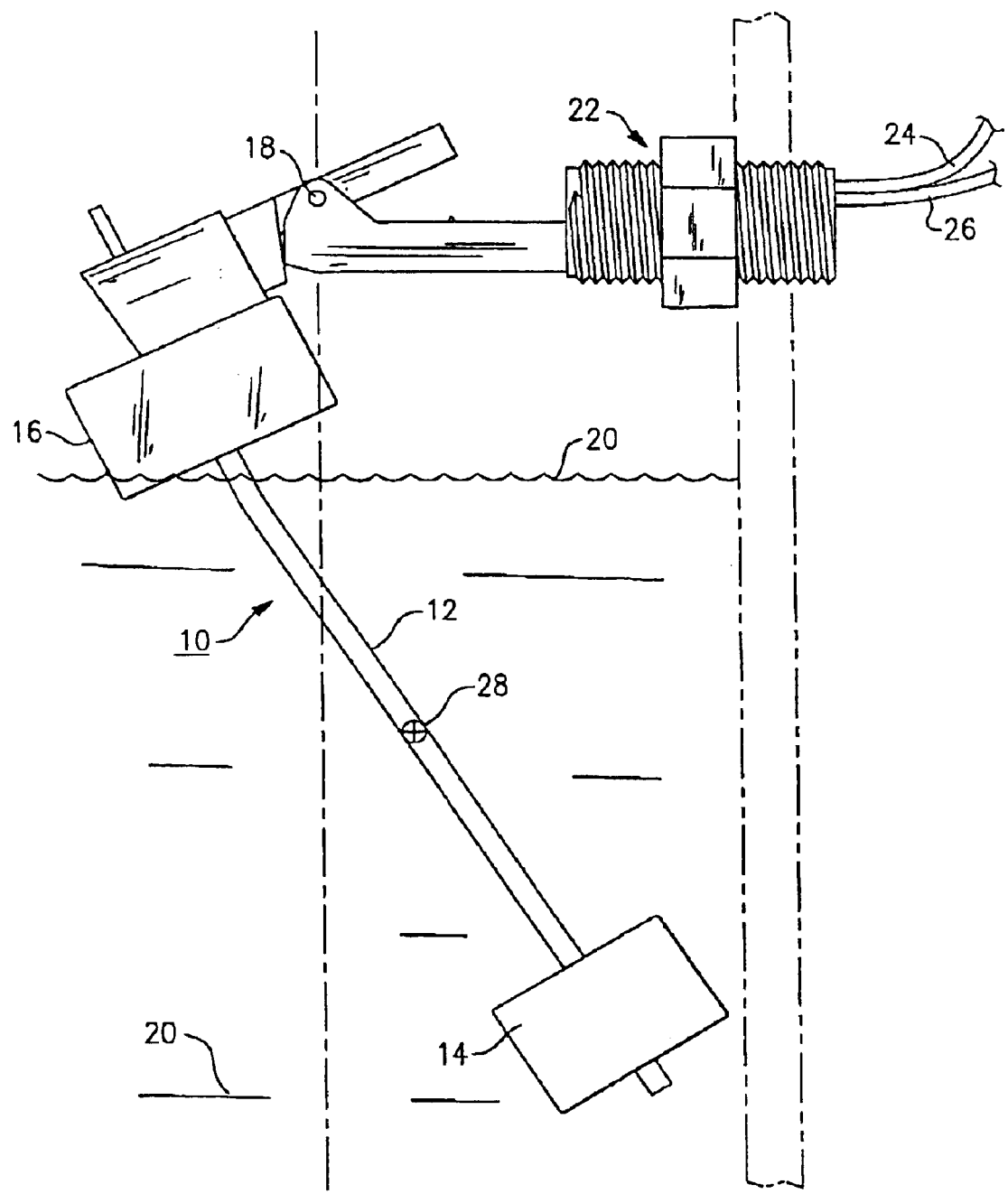
FIG. 3 is a side view of FIG. 2 with the liquid level still higher, and the switch still in the off position.

A single throw switch 22 is connected by electrical leads 24 and 26 to a pump motor control (not shown) that is capable of being activated by the float component 10 that once triggered at one float endpoint, the switch will maintain and hold this first position until oppositely triggered at the other float endpoint. FIGS. 1–3 illustrate the switch in the off position, and FIGS. 4 and 5 illustrates the switch in the on position which activates the pump motor.

Figure 4:
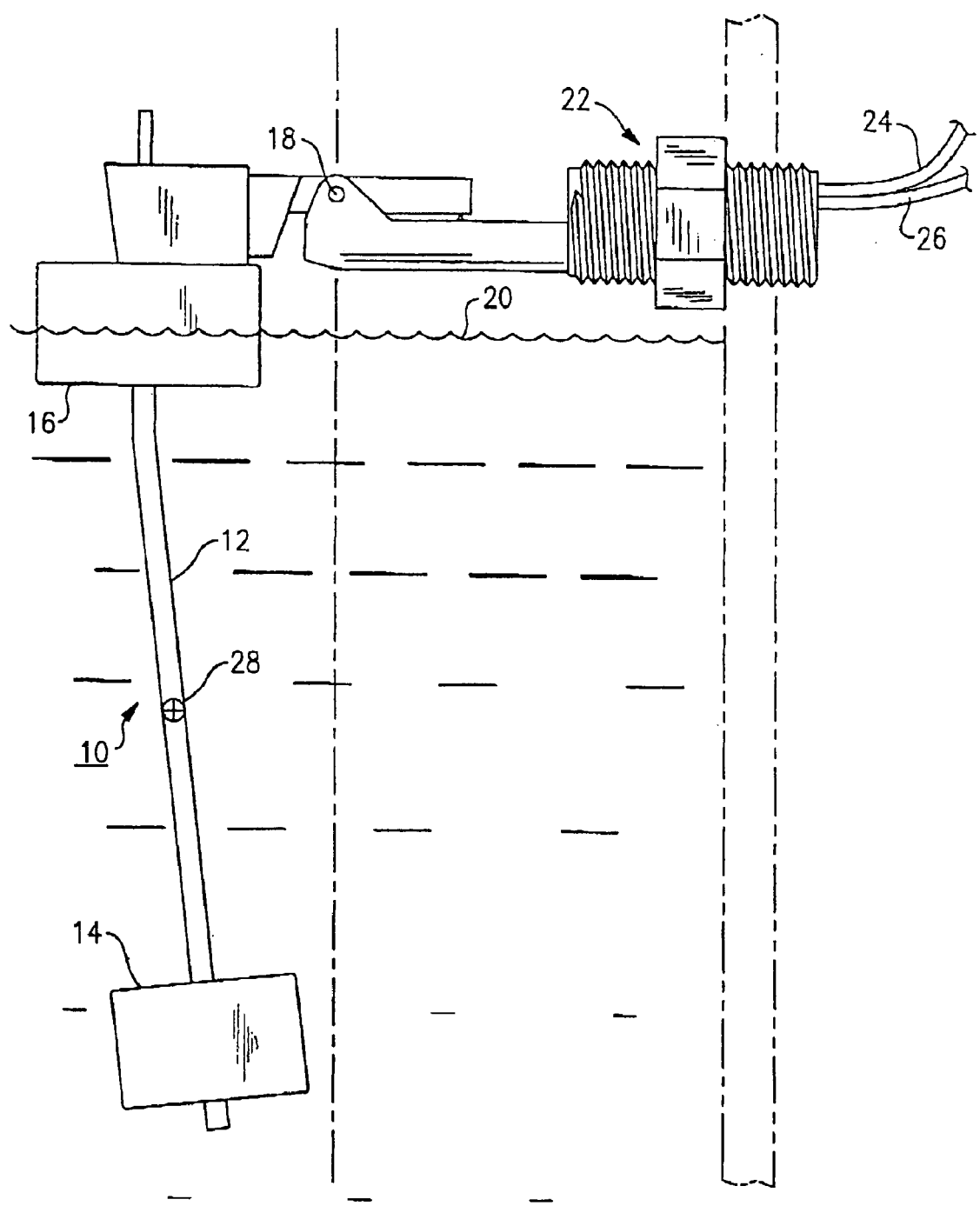
FIG. 4 is a side view of FIG. 3 with a still higher liquid level and the switch in the "on" position.
Figure 5:
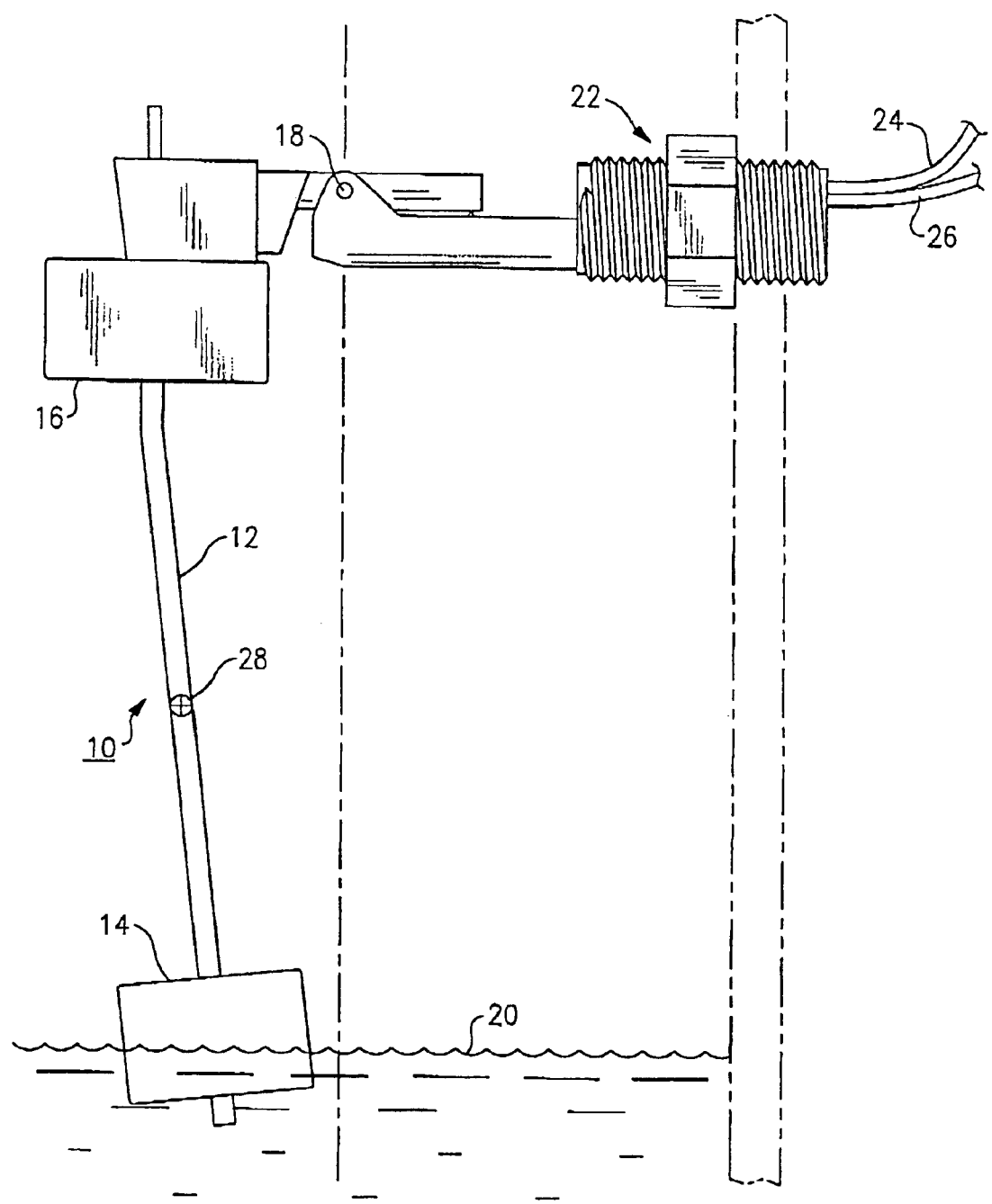
FIG. 5 is a side view of FIG. 4 with the liquid level lowered significantly and the switch still in the on position.

In this embodiment it is necessary for the float to be able to assume two distinct angular positions and hold the initially triggered angular position for the duration of the liquid level change (FIGS. 1–3) until reversibly triggered by the liquid reaching the opposite endpoint (FIG. 4), being triggered by upper float member 16 upon reaching a predetermined high level water mark (FIG. 4).

In order to achieve the holding operation of the switch, the lower float 14 is used to perform this holding or latching function separately on either side of the vertical axis through pivot point 18 as the liquid level increases or decreases. Lower float 14 maintains either angular position of buoyant component 10 in the presence of liquid 20, and reverts to only one state in the absence of a liquid as shown in FIG. 1.

In order for the float to accomplish this latching or holding operation, there are specific relationships between the pivot point, effective buoyancy, and net center of gravity of the float. These relationships have been determined at the liquid level endpoints and during both the liquid ascending and liquid descending states, and can be applied to various embodiments of the above described invention as would be apparent to one skilled in the art.

The invention is based upon the fact that there will be differing buoyant forces on a float that is pivotally restrained and fixed at a given level within a liquid source undergoing a liquid level change. By defining the required net buoyant force to be provided by the float at a given liquid level separately during both the level-increasing and level-decreasing states, in conjunction with the pivoting point, net weight and net center of gravity of the float, it is possible to create two distinct and stable angular positional states for the float.

The use of the word "float" above is for illustration purposes only, and is to be understood in describing this embodiment that the concept of the liquid level switch is broadly one that is capable of being buoyantly movable as specifically described above.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A latching fluid level switch which includes a float member having an elongated shaft member having a lower end and an opposite upper end with said lower end containing a first buoyant float member, and said upper end containing a second buoyant float member, and being pivotally anchored to a tank wall and being capable of having the lower end being moved between two distinct and stable angular positions depending on a level of the liquid in said tank acting on said first float member and having a first higher buoyancy angular position representing a high liquid level endpoint, and a second less buoyant angular position representing a lower liquid level endpoint, and having said first float member maintain each of the distinct angular positions such that once triggered at one liquid level endpoint the first float member will maintain and hold said angular position until reversibly triggered at the other liquid level endpoint.

2. The switch of claim 1 which further includes an electrical contact means capable of being activated by said float member.

3. The switch of claim 2 which includes employing a reed switch and magnet which is activated by said float member.

4. The switch of claim 2 which includes employing a mercury switch which is activated by said float member.

5. The switch of claim 2 which includes employing a tilt sensitive mechanical switch which is activated by said float member.

6. The switch of claim 1 which further includes an adjustable float section for changing the liquid level endpoints.

7. The switch of claim 1 which further includes a magnet in the float member capable of activating a reed switch in a float mounting means.

8. The switch of claim 1 which further includes a mercury switch positioned to change state in response to the angular position of the float member.

9. The switch of claim 8 which further includes positioning the mercury switch horizontally on the vertical pivot centerline of the float such that the weight of the mercury in the switch crosses said pivot centerline on float reversal and thereby enhances holding said float member in both angular positions.

10. The switch of claim 1 whereby the first buoyant float member crosses the vertical axis of the pivot anchor upon reversal.

11. A latching fluid level switch for a liquid containing tank which includes a first upper volume buoyant member, and a coacting second lower volume buoyant member, with said buoyant members being capable of being moved between two distinct and stable angular positions depending on the level of the liquid in said tank acting on said buoyant members, and with said first member having a first higher buoyancy angular position representing a high liquid level endpoint, and a second less buoyant angular position representing a low liquid level endpoint, with said second member maintaining each distinct angular position such that once triggered at one liquid level endpoint said buoyant members will maintain and hold said angular position until reversibly triggered at said other liquid level endpoint.

* * * * *